Figure 1:
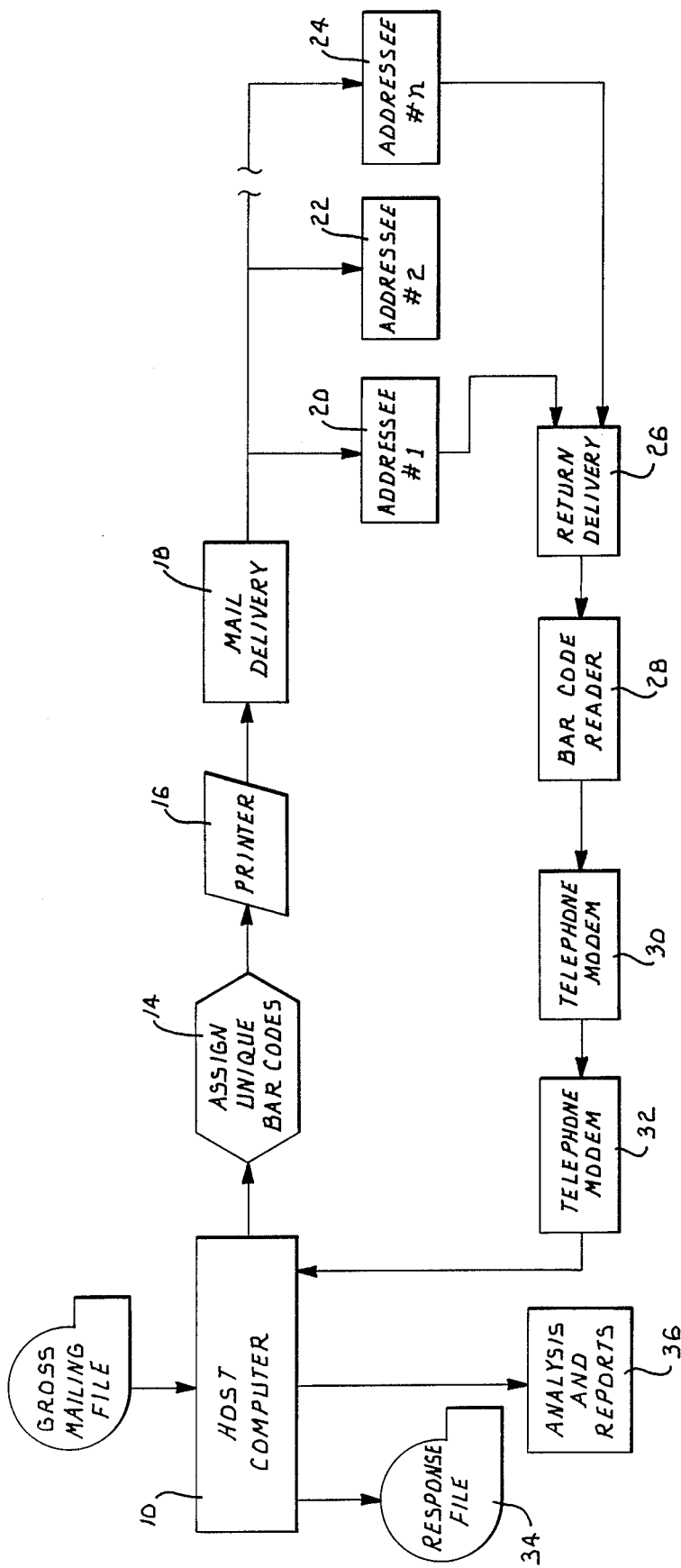

United States Patent [19]

Zetmeir

[11] Patent Number: 4,752,675
[45] Date of Patent: Jun. 21, 1988

[54] METHOD OF COLLECTING RESPONSE DATA FROM DIRECT MAIL ADVERTISING

[76] Inventor: Karl D. Zetmeir, 4201 W. 110th St., Leawood, Kans. 66211

[21] Appl. No.: 812,803

[22] Filed: Dec. 23, 1985

[51] Int. Cl.$^4$ .............................................. G06F 15/20
[52] U.S. Cl. .................................... 235/375; 235/462; 235/487
[58] Field of Search ....................... 235/375, 462, 487; 358/84; 340/825.07

[56] References Cited

U.S. PATENT DOCUMENTS

| | | | |
|---|---|---|---|
| 2,224,646 | 12/1940 | Friedman et al. | 235/462 X |
| 3,760,161 | 9/1973 | Lohne et al. | 235/462 |
| 4,476,381 | 10/1984 | Rubin | 235/491 X |
| 4,511,793 | 4/1985 | Racanelli | 235/462 X |
| 4,603,232 | 7/1986 | Kurland et al. | 358/84 X |
| 4,660,221 | 4/1987 | Dlugos | 235/462 X |

Primary Examiner—David L. Trafton
Attorney, Agent, or Firm—Kokjer, Kircher, Bradley, Wharton, Bowman & Johnson

[57] ABSTRACT

A method for determining the effectiveness of a mass advertising wherein each advertising material sent to a particular addressee is encoded before sending with its unique identifying bar code bymbol. The material invites each addressee to return to the sender at least the portion of the material containing the symbol. The returned symbols are read and the information encoded in the symbol is transmitted to a computer containing a master file list of the respective symbols associated with the corresponding addressees. The information from the returned symbols is compared with the master file list for analysis of the effectiveness of the advertising.

6 Claims, 1 Drawing Sheet

METHOD OF COLLECTING RESPONSE DATA FROM DIRECT MAIL ADVERTISING

This invention pertains to advertising procedures, and more particularly, to a method of recording individually the responses received from a direct mail advertising program.

Direct mail advertising has come to be a principal and widely used form of advertising. In accordance with this procedure, the goods or services offered by suppliers are described in literature which is then sent through the mails to various prospective customers. This type of literature often contains responders in the form of coupons or the like which the prospective customer is invited to return to the source of the advertising mailer to indicate an interest in the goods or services or to request further information pertaining to such goods or services. Advertising of this kind is referred to as "direct response" advertising.

Direct mail advertising is often carried out in the form of mass mailings of many thousands of pieces of literature to as many addressees. These mass mailings are also often conducted for the various suppliers by independent contractors who may provide all or many of the necessary elements from creating the advertising literature through recording and reporting to their clients the results obtained from the mailings as reflected by the responses received.

A great deal of data, valuable to a particular supplier, is potentially available from an analysis of the returns received from any particular direct response advertising campaign. Of utmost interest to a supplier is the demography of the group of potential customers who respond. This is particularly of interest when compared to those who do not respond. A variety of data of this type can be quite important when subjected to meaningful analysis.

In the past, efforts have been made to maintain some modicum of control over mailings of this type so that the results may be scrutinized for valuable data. One method employed for this purpose has been to encode each item of a mass mailing with a common symbol or identifier so that the relative success of the particular advertising campaign can be assessed. This procedure, combined with limiting each mass mailing to a particular class of addressees, or to those residing in a particular geographical area, does yield useful information upon which the advertisers may base future sales efforts, marketing strategies, or both.

Heretofore, however, efforts to maintain identification control in mass advertising has been slow and cumbersome. Each item or group of items desired to be tracked for subsequent analysis was typically given an identification symbol comprised of numbers, letters, or a combination of both. Sometimes the identifying symbols were manually encoded on the advertising material. In any event, the responses were usually read and recorded manually. As a result, the process for tracking mass mail, direct response advertising has been so unwieldly and expensive that it has been utilized only to a relatively limited extent.

Accordingly, it is the primary object of this invention is to provide a method for carrying out direct mail advertising wherein the returns from each addressee may be quickly and easily separately identified to yield data for analysis by the sender specific as to each such addressee.

In the achievement of the foregoing object, it is yet another very important object of the present invention to provide a method whereby the advertising literature sent to each addressee is provided with its individual and identifiable, machine readable encoded marking and wherein a record of the particular marking assigned to each addressee is retained for future comparison with the returns from the addressees so that such returns can be analyzed for valuable data relative to the results of the advertising effort.

A yet further object of this invention is to provide an advertising method wherein the results of a particular direct mail advertising campaign may be quickly and easily obtained mechanically, stored and compared with information already available as to the addresses to which the advertising literature is sent to facilitate such analysis of the results as may be appropriate to enhance the effectiveness of direct mail advertising.

These and other important aims and objectives of the present invention will be further described or will become apparent from the following description and claims. The single figure of the drawing illustrates generally the method of this invention.

Mass direct mail advertising is in widespread use and has been considered a very effective means of advertising goods and services to a great many potential customers. Pursuant to this form of advertising, literature offering the goods and services is individually sent to the prospective customers through the mails to their respective addresses or addressed in a manner that it ultimately reaches the intended prospective customers. The number of addressees to which literature of this type is sent in any particular direct mail advertising campaign is governed by the desires of the advertiser. In some cases the literature may be sent to a relatively small, restricted class. In other cases, certain mailings might be made to virtually every mail box holder in the entire country. In almost every case, however, it is desirable to be able to identify and, in some manner or another, measure or otherwise record the results achieved.

A means for providing an object with information which can be determined or "read" by a machine is a grouping of symbols commonly referred to as a "bar code". A bar code is a self-contained message with information encoded in the widths of bars and spaces in a printed pattern. Bar codes are capable of being read at a high rate of speed by mechanical means. One common method for reading bar codes of this type involves the sweeping of a small spot of light across the printed bar code symbol. The reflected light is received by a photoelectric cell converting the reflected light into electrical impulses. Bar codes have received widespread acceptance for the purpose of recording pricing and similar information on consumer goods to facilitate the "check out" operation at stores where such items are sold.

Applicant has discovered that, through the use of bar codes, the effectiveness of the tracking of mass advertising is greatly enhanced and the costs of such operations can be reduced to a small fraction of that involved when conventional unwieldly methods were employed. As a result, valuable information which was heretofore often lost, may now be readily made available to the advertisers.

Pursuant to the method of this invention, the advertisement sent to each addressee is separately coded with its individual, unique bar code. In other words, the bar code which is imprinted on each separate advertising differs in some respect, and therefor contains information which differs, at least slightly and identifiably, from that contained on every other advertising to be sent to the other addressees in connection with the mass advertising effort.

Advertising mailings of the type contemplated by this invention are of the direct response type. As such, they solicit the return of all or a portion of the advertising by the recipient. This may take the form of a request for further information, a discount coupon to be applied to the purchase price for the advertised goods or services, or a completed order form requesting the goods or services. Other possible responses are, of course, possible.

In order to provide for the collection of valuable data relevant to the results of the advertising campaign, the bar code must be applied to the portion of the advertising literature intended to be returned by the addressee. It may be applied directly on the literature by laser xerography or other suitable process.

It is of primary importance to the method of this invention that each bar code be different and that each contain identifying information pertaining to or which may later be used to associate its return with the particular addressee to which it is sent. The procedures by which each bar code may be varied to include such information are well known to those skilled in the bar code art and do not form any part, per se, of this invention. Accordingly, they need not be set forth in detail herein. It suffices to point out that both the list of addresses for the literature and the particular bar code information pertaining to each addressee are ordinarily maintained in the data bank of a computer by the advertiser or, in the alternative, by an advertising agent handling such matters for and on behalf of the advertiser.

Once the respective advertising literature, and particularly the returnable portion or portions of such literature is provided with its unique bar code identifier, the literature is mailed or otherwise sent to the addressees. Commonly, each individual mailing forms but a single part of a mass advertising mailing involving the sending of many items of advertising literature to many prospective customers with all items being substantially identical except for the variations in the bar code identifiers and the address information.

As each returnable item from the literature is returned by those prospective customers who respond as invited, the respective bar codes from the returned items are read and the information is recorded and stored. Again, the specific device used for this purpose is not a particular feature of this invention per se. It suffices to point out that any of a number of commercially available bar code scanners could be used for this purpose. Applicant has found that a commercially available light type, rechargeable pen shaped scanner having automatic code validation with both audible and visual signals is satisfactory for this purpose. One scanner of this kind has a storage capacity for recording and storing up to four hundred read responses and emitting a tone signal to indicate when the memory capacity is full.

It is necessary for the information relative to the returned bar codes from the mailing to be associated with the data in the computer identifying the respective bar codes with the addresses in order to yield the most meaningful output for analysis by the advertiser. This could, if desired, be accomplished in any of a variety of acceptable ways. For example, the bar code scanner could be operatively connected directly with the computer so that the read results would be sent directly to this computer.

In practice, it has been found to be expedient to utilize a commercially available downloader for the bar code scanner which receives the accumulated information from the bar codes which has been temporarily stored in the scanner and automatically transmits this data through a telephone data modem via telephone line to the memory storage facilities of a computer. The modem converts the signal transmitted by the downloader to a digital signal which may be transmitted over the telephone lines and is compatible for acceptance by the computer.

Once the information garnered by reading the bar code symbols of the various responses from the mass mail advertising campaign is in the computer, the information may be subjected to such analysis as is desired by the advertiser. The information is rendered particularly significant when such information is matched to the stored information in the master file of the computer. As a first step in the analysis, each individual return, as read from the returned bar code portion of the advertisement, is matched with the data relevant to the particular addressee to whom it was sent.

This step of matching each return with its corresponding addressee reveals substantial and valuable information to the advertiser which has heretofore been very difficult for the advertisers to obtain. The method of this invention permits the inexpensive and easy gathering of demographic information which is highly valuable in determining the overall effectiveness of the advertising effort, as well as the identification of particular subgroups or persons in particular geographic regions where the advertising has been most effective. This information, and information of this general type, is useful to the advertiser for planning and conducting subsequent mass mail advertising efforts.

Referring now to the drawing which illustrates graphically one manner in which the foregoing method may be carried out, the reference numeral 10 denotes a host computer which can be of any suitable type capable of storing and processing the information as may be useful in connection with a particular mass mail advertising campaign. Computer 10 (which could, of course, be one or a plurality of computers as may be desired) provides the data bank which retains the list of addresses for the literature involved in the mass mail advertising campaign or gross mailing file 12 which is entered into computer 10. The computer also retains the information pertaining to each unique bar code assigned at station 14 (usually by computer 10) to the material destined for each addressee.

The respective bar codes for each addressee are imprinted on the material at station 16 and the materials for each addressee are mailed, along with the other materials to the various addresses involved in the campaign, by mass mailing by step 18 for eventual delivery to their respective destinations.

The respective addresses (which may number into the hundreds of thousands or even millions) are represented symbolically as addressee #1 designated by the reference numeral 20, addressee #2 designated by the numeral 22, and addressee #n designated by the numeral 24.

It may be assumed, of course, that some, but not all addressees who receive the materials delivered to them in a mass mailing campaign will return the portion of the materials invited to be returned to the sender. In the drawing, it is assumed that addressees designate 20 and 24 do return such portions and addressee designated 22 does not do so. Such return, which may be, but is not necessarily by mail, is designed by the numeral 26 on the drawing.

The returned portions from the mass mailings contain the respective unique bar codes assigned by computer 10 to the respective addressees and these are read at station or stations designated 28 for transmittal of the information as by telephonic means through modems 30 and 32 for storage and processing in computer 10.

Once the data garnered from the response portions containing the individual unique bar codes is collected at computer 10 in a response file 34, such information is readily compared with the gross mailing file in the computer to derive a wide variety of useful analyses and reports 36 from the results of the mass mailing campaign as heretofore described.

Having thus described the invention I claim:

1. A method of obtaining information concerning the effectiveness of mass mail advertising comprising the steps of:
   encoding the advertising material to be sent to each addressee of the material with its unique identifying bar code symbol;
   retaining a master file list of the addresses of said material and the identifying bar code symbol assigned to the material to be sent to each addressee;
   sending by mass mailing the advertising material to the respective addressees;
   by invitation which is sent to the addressees with the advertising material, inviting the respective addressees to return at least a portion of said material to the sender, said portion including the bar code symbol of the material;
   receiving such portions as are actually returned and reading the bar code symbols from such returned portions respectively; and
   comparing the bar code symbols of the respective returned portions with said master file list to identify the addressees who have returned said symbols to reveal information concerning the effectiveness of the mass mail advertising.

2. The method as set forth in claim 1, wherein the step of reading the bar code symbols from the returned portions of said material is carried out by a mechanical bar code scanner.

3. The method as set forth in claim 2, wherein said bar code scanner is of a light emitting, photoelectric type.

4. The method as set forth in claim 1, wherein is included the step of storing the information read from the respective received bar code symbols, followed by transmitting the stored information to the master file list for comparison.

5. The method as set forth in claim 4, wherein the master file list is stored in a computer, and wherein the information read from the respective received bar code symbols is transmitted to the computer for comparison by means of the computer with said stored master file list.

6. The method set forth in claim 5, wherein the step of transmitting the stored information from the received bar code symbols includes the step of transmitting signals representing such information to the computer by telephone line through a modem.

* * * * *